E. J. TAYLOR.
SHAFT BEARING CENTRALIZER.
APPLICATION FILED FEB. 28, 1916.
1,246,181.
Patented Nov. 13, 1917.
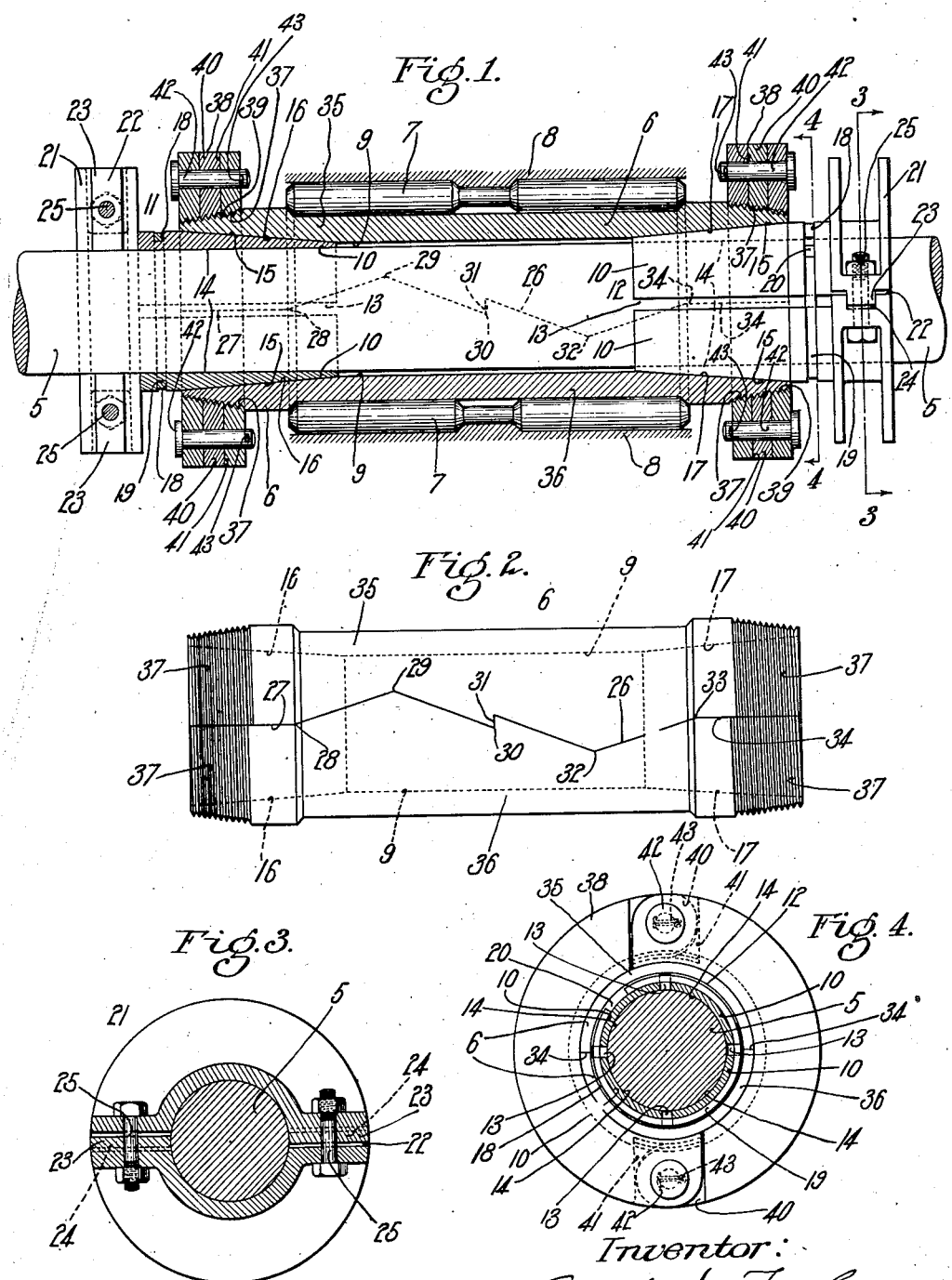
Inventor: Ernest J. Taylor
by his attorney, Charles N. Gooding

UNITED STATES PATENT OFFICE.

ERNEST J. TAYLOR, OF NEEDHAM HEIGHTS, MASSACHUSETTS.

SHAFT-BEARING CENTRALIZER.

1,246,181.  Specification of Letters Patent.  Patented Nov. 13, 1917.

Application filed February 28, 1916. Serial No. 80,805.

*To all whom it may concern:*

Be it known that I, ERNEST J. TAYLOR, a citizen of the United States, residing at Needham Heights, in the county of Norfolk and State of Massachusetts, have invented new and useful Improvements in Shaft-Bearing Centralizers, of which the following is a specification.

This invention relates to improvements in devices for centralizing shafts in bearings or more particularly in the inner sleeve or raceway of a roller or ball bearing. In setting up a roller or ball bearing about a shaft, it is desirable that the inner sleeve or raceway of said bearing be attached firmly to the shaft, and also be located exactly central relatively thereto in order to prevent noise or vibration.

Furthermore, the sleeve must be so mounted on said shaft as to eliminate any distortion thereof which would, if permitted to exist, cause certain rollers of the bearings to be exposed to greater wear than others. Then again, the sleeve or inner raceway must retain its intended diameter to prevent any play between said inner race and said outer race of the bearing which, if permitted to exist, would in time crystallize the metal from which the shaft is made and likewise parts of the bearing, to say nothing of the loss or at least the interference with the smooth running of the rollers of said bearing.

The object of the invention is to provide a simple, compact and durable device adapted to positively centralize the inner sleeve or raceway of the bearing and to secure the same in such relation without distorting said inner raceway and irrespective, within certain limits, of the diameter of the shaft to which the raceway or sleeve is to be attached.

Another object of the invention is to provide a device of the character hereinbefore set forth, which is particularly adapted to be applied to line shafting and may be applied to any part of the shafting without necessitating the taking down thereof or the disconnecting of said shaft from bearings on either side of the portion or location to which the particular bearing in question is to be located.

The invention consists in the combination and arrangement of parts set forth in the following specification and particularly pointed out in the claims.

Referring to the drawings:

Figure 1 is a longitudinal section through a bearing embodying my invention, portions of said bearing at the right hand end of said figure being shown in elevation to more clearly illustrate certain features thereof.

Fig. 2 is a detail side elevation of the bearing sleeve, illustrating the novel manner in which the sleeve is split longitudinally.

Fig. 3 is a section taken on the line 3—3 of Fig. 1.

Fig. 4 is a section taken on the line 4—4 of Fig. 1.

Like numerals refer to like parts in all views of the drawings.

In the drawings 5 is a shaft and 6 a sleeve which, in the present embodiment, constitutes the inner bearing member or raceway of a roller bearing, the rollers 7 being shown in contact with said sleeve, while the outer raceway of said bearing is shown in part at 8. The sleeve 6 is provided with a bore 9 of slightly larger diameter than that of the largest shaft which may be used in connection with the same, thus providing an annular space between said shaft and said sleeve to allow for any irregularities or unevenness in said shaft.

To compensate for the difference between the diameter of the shaft 5 and the bore of the sleeve 6, tapered members 10 are provided, said tapered members preferably consisting of two sets 11 and 12 of segmental wedges as indicated at 10, each set preferably consisting of four each, arranged about the shaft 5 with clearance 13 provided between the several members thereof. The inner bore 14 of each set of wedges may correspond if desired to the particular shaft to which the same may be applied, although this is not absolutely essential.

The outer surfaces 15 of said segmental members 10 are tapered or inclined surfaces, and these surfaces are adapted to engage correspondingly tapered portions 16 and 17 respectively formed at opposite ends of the bore 9 of the sleeve 6, the thin portions of the wedges being disposed toward each other so as to require the movements of said sets of wedges toward each other in order to securely and positively position the sleeve with respect to the shaft.

To assist in assembling the segmental wedges 10 about the shaft and to properly aline the same relatively to each other, an annular groove 18 is provided in the larger end of each set of wedges and within said annular groove is placed a split spring ring 19, the interruption or split 20 of said ring being disposed preferably between the clearance spaces 13, as will be seen in Fig. 4.

The ring 19 is of sufficient strength to retain the wedges of each set firmly against the shaft but permitting them to be moved longitudinally thereof. A collar 21 is arranged upon said shaft, one against each of the outer or thick ends of the sets of wedges 11 and 12, said collars being constructed and arranged to be clamped or secured to the shaft when desired, in order to maintain said wedges in the desired positions with respect to the sleeve.

The preferred manner of securing said collar to the shaft 5 preferably consists in splitting said collars at 22 substantially in halves, the abutting faces of the members of said collar having tongues and grooves 23 and 24 respectively, for the purpose of properly alining the opposite faces of the two halves of said collars with respect to each other. Bolts 25 extend from one portion of the collar 21 to the other and are adapted to firmly secure said portion together to clamp the collar to the shaft, clearance being allowed between the two portions of said collar in order to compensate for any slight variations in the diameter of the shafts which are to be inserted in the bearing.

By splitting the collars 21, as stated, it would be possible to apply the same to the shaft at any point in its length, regardless of the number of bearings therefor and without disturbing any of said bearings, and in order that the other portions of the bearings in question may be likewise applied to said shaft all parts relating thereto have been split and more particularly the sleeve 6 which has been split upon opposite sides thereof along irregular lines 26 extending longitudinally of the sleeve.

The lines 26 referred to continue in a straight line as at 27 and parallel with the median axial line of said sleeve from the left hand end, see Fig. 2, to a point 28 just outside of the zone of said bearing which contacts with the rollers 7. From the point 28 the split extends at an angle to the straight line 7 to a point 29 substantially midway between the point 28 and the center of the bearing.

The inclination of the split is reversed from the point 29 to the center of said bearing, as indicated at 30; thence circumferentially of said bearing along the center line thereof, as indicated at 31 for a short distance to provide an abutment, whereby the two sections of the bearing may be properly positioned with respect to each other, even though the corresponding faces along the irregular lines 26 are not in contact with each other.

From the line 31 the line 26 extends preferably parallel with the line 29 to 30 to a point 32 which is substantially midway between the straight portion 31 or the center of the bearing and the opposite edge of the race of the sleeve 6, from that indicated by the point 28. From the point 32 the irregular line extends in a direction substantially parallel to the line 28 and 29 to a point 33 at the edge of said race and along the line 34 coinciding with the line 27 at the opposite end of the sleeve.

The line representing the split for the opposite side of the bearing as shown in dotted lines in Fig. 1 is preferably formed in the same manner and coincides with the one just described, thereby requiring only one pattern equivalent to one half of the sleeve in the construction of said sleeve, the upper part 35 of said sleeve being an exact counterpart to the lower part 36 thereof, while the joints of said two parts within the range of the rollers 7 will be split so as to insure the smooth running of said rollers thereacross.

It is essential that the two members 35 and 36 of the sleeve be secured tightly together when the same is in operation in order that the rollers may not be cramped and that no binding of the rollers between the roller races take place. To insure such the sleeve 6 is externally tapered and provided with screw threads 37 at opposite ends thereof adapted to be engaged by collars 38 having correspondingly tapered and threaded bores 39 which collars may be screwed upon said tapered ends until the two sections of said sleeve are firmly bound together.

The collars 38 are also split collars, the same being provided with tongues 40 constructed and arranged to fit into recesses 41 and be held in such relation by studs 42 which extend transversely of said tongues through the two sections of said collars and are held in place therein by cotter pins 43, thus providing a construction which may be readily disconnected to allow the collars to be taken off or applied to a shaft, one of the pins constituting a hinge, permitting the two sections of said collar to be swung thereon after the other of said pins has been withdrawn.

Each set of the tapered segmental members 10 preferably consists, as hereinbefore stated, of four members, so as to more readily conform to the shafts of varying diameter. The outer surfaces of said wedges are adapted at all times, and regardless of the size of shafting, to exactly conform to the tapered portions of the sleeve in order to prevent distortion of said sleeve when pressure is applied to said wedges.

These wedges are, however, made strong enough so as to permit them to engage the shafts of different sizes to exactly conform to said shaft. The shortness of the segments circumferentially facilitate the conforming of the sets of wedges to the shafts to which they are clamped.

Having thus described my invention what I claim and desire by Letters Patent to secure is:

1. A device of the class described having, in combination, a shaft, a sleeve surrounding said shaft, tapered members interposed between opposite ends of said sleeve and said shaft, and means constructed and arranged to move said tapered members lengthwise of said shaft to centralize said sleeve thereon.

2. A device of the class described having, in combination, a shaft, a sleeve surrounding said shaft, opposite ends of the bore of said sleeve being tapered, tapered members interposed between said shaft and the tapered portions of said sleeve, and means constructed and arranged to move said tapered members lengthwise of said shaft to centralize said sleeve thereon.

3. A device of the class described having, in combination, a shaft, a sleeve surrounding said shaft, opposite ends of the bore of said sleeve being tapered, a set of segmental wedges interposed between each tapered portion of said sleeve and the adjacent portions of said shaft, and means constructed and arranged to move said segmental wedges lengthwise of said shaft to position said sleeve with respect thereto.

4. A device of the class described, having, in combination, a shaft, a sleeve surrounding said shaft, opposite ends of the bore of said sleeve being tapered, a set of segmental wedges interposed between each tapered portion of said sleeve and the adjacent portions of said shaft, means constructed and arranged to aline the segmental wedges of the respective sets, and means constructed and arranged to move said sets of segmental wedges lengthwise of said shaft to position said sleeve with respect to said shaft.

5. A device of the class described having, in combination, a shaft, a sleeve surrounding said shaft, opposite ends of the bore of said sleeve being tapered, a set of segmental wedges interposed between each tapered portion of said sleeve and the adjacent portions of said shaft, each of said wedges having a groove in its periphery adapted to aline with the grooves of the other wedges of said set, a spring ring adapted to encircle the wedges of each set within said grooves to retain said wedges in proper relation on said shaft, and means constructed and arranged to position said sets of wedges with respect to said sleeve.

6. A device of the class described having, in combination, a shaft, a sleeve surrounding said shaft, tapered members interposed between opposite ends of said sleeve and the adjacent portions of said shaft, and a collar adjustably arranged upon said shaft in contact with each of said tapered members and constructed and arranged to be secured to said shaft.

7. A device of the class described having, in combination, a shaft, a sleeve surrounding said shaft, said sleeve being separated longitudinally into two substantially similar members, means for securing said members together, and means for positioning said sleeve on said shaft.

8. A device of the class described having, in combination, a shaft, a sleeve surrounding said shaft, said sleeve being separated longitudinally along irregular lines into two substantially similar members, means for securing said members together, and means for positioning said sleeve on said shaft.

9. In a device of the class described a sleeve, consisting of two substantially identical members separated along irregular lines extending longitudinally thereof, opposite ends of said sleeve being tapered, screw threads formed upon said tapered ends, and split collars having screw threads upon their inner surfaces constructed and arranged to engage the screw threads at each of the ends of said sleeve adapted to secure the two members of said sleeve together.

10. A device of the class described having, in combination, a shaft, a sleeve surrounding said shaft, said sleeve having a bore substantially larger in diameter than said shaft, opposite ends of said bore being tapered, and a set of segmental wedges arranged at each end of said sleeve intermediate of said tapered portions and the adjacent portions of said shaft, adapted to centralize said sleeve on said shaft.

11. A device of the class described having, in combination, a shaft, a sleeve surrounding said shaft, said sleeve having a bore substantially larger in diameter than said shaft, opposite ends of said bore being tapered, a set of segmental wedges arranged at each end of said sleeve intermediate of said tapered portions and the adjacent portions of said shaft, adapted to centralize said sleeve on said shaft, and a split collar adjustably secured to said shaft in contact with each of said sets of segmental wedges, said collars being constructed and arranged to hold said sets of wedges in position with respect to said sleeve.

12. A device of the class described having, in combination, a shaft, a sleeve surrounding said shaft, a set of segmental wedges interposed between each end of said sleeve, and the adjacent portions of said shaft, split collars at opposite ends of said sleeve constructed and arranged to engage and maintain in alinement the wedges constituting said sets respectively, and means for alining the faces of said collars engaging said wedges.

In testimony whereof I have hereunto set my hand in presence of two subscribing witnesses.

ERNEST J. TAYLOR.

Witnesses:
 CHARLES S. GOODING,
 SYDNEY E. TAFT.